Patented Nov. 14, 1939

2,180,245

UNITED STATES PATENT OFFICE 2,180,245

SUBSTANTIVE POLYAZO DYESTUFFS AND THEIR MANUFACTURE

Adolf Krebser, Riehen, near Basel, Switzerland, assignor to the firm of J. R. Geigy A. G., Basel, Switzerland No Drawing. Application April 14, 1938, Serial No. 202,127. In Switzerland April 21, 1937

10 Claims. (Cl. 260—166)

This invention relates to the production of polyazo substantive dyestuffs, and provides a process of producing valuable dyestuffs dyeing textile materials such as cotton a fast greeny-blue.

United States Patent No. 1,829,672 describes a process for the production of tetrakisazo dyestuffs in which diazo compounds of disazo dyestuffs of the type $$A-N=N-M_1-N=N-M_2-NH_2$$

(wherein A represents the residue of a benzene or naphthalene sulphonic or carboxylic acid and $M_1$ and $M_2$ are the residues of 1-naphthylamine, 1-naphthylamine-6- or -7-sulphonic acid or a mixture of the two sulphonic acids) are combined with a monoazo dyestuff obtainable by coupling in acid solution a diazo body of the benzene and naphthalene series with 2:5-aminonaphthol-7-monosulphonic acid.

United States Patent No. 1,829,673 claims a process for the production of similar dyestuffs in which diazo compounds of disazo dyestuffs of the general formula $$A-N=N-B-N=N-C-NH_2$$

wherein A and B represent the residues A and $M_1$ of the Patent No. 1,829,672, but C represents the residue of a 1:2-aminonaphtholether-6-sulphonic acid, are combined with acid coupled monoazo dyestuffs of the 2:5-amino-naphthol-7-monosulphonic acid in acid solution.

According to the present invention valuable light-fast dyestuffs of greeny-blue dyeing tone are obtained by combining diazo compounds of disazo dyestuffs of the type $$A-N=N-M_1-N=N-M_2-NH_2$$

(wherein A represents the residue of a benzene or naphthalene derivative, $M_1$ the residue of 1-naphthylamine, 1-naphthylamine-6- or 7-sulphonic acid or a mixture of the two sulphonic acids, but $M_2$ represents the residue of amino-hydroquinone-dialkyl- or -diaralkyl-ethers) with monoazo dyestuffs which are obtained by coupling in acid solution diazo compounds with 2:5-amino-naphthol-7-monosulphonic acid.

The use of these amino-hydroquinone-dialkyl- or -diaralkylethers is known for the production of substantive azo dyestuffs, for example for disazo dyestuffs in British Patent No. 15,403/1909 and for trisazo dyestuffs in British specification 432,122 with amino-benzoyl-2:5-amino-naphthol-7-monosulphonic acid as final component. Compared with these known combinations the new tetrakisazo dyestuffs of the present invention are characterised by a change of the dyeing tone towards greeny-blue and an improvement of the fastness to light.

Example 17.3 parts of aniline-o-sulphonic acid are diazotised and coupled in known manner with 24.5 parts of Cleve's 1-naphthylamine-7-sulphonic acid. Further diazotising is effected, the diazo body is isolated and coupled in a weak mineral acid solution with 16 parts of amino-hydroquinone-dimethyl-ether. After completion of the coupling further diazotising is effected and the new diazo compound is salted out and filtered off. The grey-black press-cakes are formed into a paste with water at 0° C. and introduced into a solution, produced with 400 parts of water and 30 parts of 20% ammonia, of a monoazo dyestuff, which in turn is obtained in known manner by acid combination of 17.3 parts of diazotised metanilic acid with 24 parts of 2:5-amino-naphthol-7-monosulphonic acid. After completion of the coupling the bronzing dyestuff is separated completely with a little salt, filtered off and dried. It dissolves blue in water, blue-grey in concentrated sulphuric acid, and dyes cotton directly in fast greeny-blue shades.

Instead of o-sulphanilic acid used as initial component, there may be used, also in the place of diazotised metanilic acid, coupled in acid solution with 2:5-amino-naphthol-7-monosulphonic acid, any other diazotisable compounds of the benzene or naphthalene series. For example there may be mentioned: sulfanilic acid, aniline-2:5-disulphonic acid, 2-naphthylamine-4:8-disulphonic acid, or 4-chloraniline-3-sulphonic acid. Instead of the above mentioned Cleve's acid 1,7 the analogous 1,6-acid or α-naphthylamine may be used, instead of the amino-hydroquinone dimethyl ether the corresponding diethyl- or dibenzyl- compound may be used. The dyestuffs obtained have quite similar properties. As further examples the following dyestuffs may be enumerated: Aniline-o-sulphonic acid-azo-1-naphthylamine-7-sulphonic acid-azo-amino-hydroquinone - diethyl - ether-azo-2:5-aminonaphthol - 7 - monosulphonic acid - azo - 4 - chloro-1-aminobenzene-3-sulphonic acid or 2-naphthylamine - 4:8 - disulphonic acid-azo - 1 - naphthylamine-6- and -7-sulphonic acid-mixture-azo-amino - hydroquinone - dimethylether - azo -2:5-amino-naphthol-7-monosulphonic acid-azo sulfanilic acid.

What I claim is:

1. A process for the manufacture of substantive polyazo-dyestuffs comprising coupling a diazo-compound of a disazo-dyestuff of the type

A—N=N—M₁—N=N—M₂—NH₂ wherein A represents a member of the group consisting of residues of benzene and naphthalene sulphonic acids, M₁ represents a member of the group consisting of residues of α-naphthylamine, 1-naphthylamine-6-sulphonic acid, 1-naphthylamine-7-sulphonic acid, and a mixture of 1-naphthylamine-6-sulphonic acid and 1-naphthylamine-7-sulphonic acid, and M₂ represents a member of the group consisting of amino-hydroquinone-dialkyl- and amino-hydroquinone-diaralkyl-ethers, with a monoazo-dyestuff obtainable by coupling in acid solution a member of the group consisting of diazotized amino-sulphonic acids of the benzene and naphthalene series with 2:5-amino-naphthol-7-monosulphonic acid.

2. A process for the manufacture of substantive polyazo-dyestuffs comprising coupling a diazo-compound from aniline-o-sulphonic acid-azo-1-naphthylamine-7-sulphonic acid-azo-amino-hydroquinone-dimethylether with a monoazo-dyestuff obtainable by coupling in acid solution a member of the group consisting of diazotized amino-sulphonic acids of the benzene and naphthalene series with 2:5-aminonaphthol-7-monosulphonic acid.

3. A process for the manufacture of substantive polyazo-dyestuffs comprising coupling a diazo-compound of a disazo-dyestuff of the type

A—N=N—M₁—N=N—M₂—NH₂ wherein A represents a member of the group consisting of residues of benzene and naphthalene sulphonic acids, M₁ represents a member of the group consisting of residues of α-naphthylamine, 1-naphthylamine-6-sulphonic acid, 1-naphthylamine-7-sulphonic acid, and a mixture of 1-naphthylamine-6-sulphonic acid and 1-naphthylamine-7-sulphonic acid, and M₂ represents a member of the group consisting of amino-hydroquinone-dialkyl- and amino-hydroquinone-diaralkyl-ethers, with a monoazo-dyestuff obtainable by coupling in acid solution a diazotized meta-aminobenzene sulphonic acid with 2:5-aminonaphthol-7-monosulphonic acid.

4. A process for the manufacture of substantive polyazo-dyestuffs comprising coupling a diazo-compound from aniline-o-sulphonic acid-azo-1-naphthylamine-7-sulphonic acid-azo-amino-hydroquinone-dimethylether with a monoazo-dyestuff obtainable by coupling in acid solution diazotized metanilic acid with 2:5-aminonaphthol-7-monosulphonic acid.

5. A process for the manufacture of substantive polyazo-dyestuffs comprising coupling a diazo-compound from 2-naphthylamine-4:8-disulphonic acid-azo-1-naphthyl-amine-6- and -7-sulphonic acid - mixture - azo - amino-hydroquinone-dimethylether with a monoazo-dyestuff obtainable by coupling in acid solution diazotized sulfanilic acid with 2:5-aminonaphthol-7-monosulphonic acid.

6. A process for the manufacture of substantive polyazo-dyestuffs comprising coupling a diazo-compound from aniline-o-sulphonic acid-azo-1-naphthylamine-7-sulphonic acid-azo-amino-hydroquinone-diethylether with a monoazo-dyestuff obtainable by coupling in acid solution diazotized 4 - chloro - 1 - aminobenzene-3-sulphonic acid with 2:5-amino-naphthol-7-monosulphonic acid.

7. The substantive polyazo-dyestuffs which correspond in the free state to the following formula

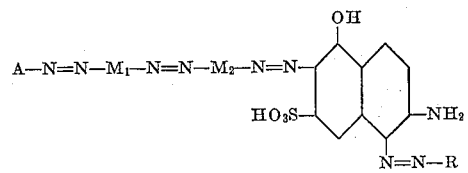

wherein A represents a member of the group consisting of residues of benzene and naphthalene sulphonic acids, M₁ represents a member of the group consisting of α-naphthylamine, 1-naphthylamine-6-sulphonic acid, 1-naphthylamine-7-sulphonic acid, and a mixture of 1-naphthylamine-6-sulphonic acid and 1-naphthylamine-7-sulphonic acid, M₂ represents a member of the group consisting of amino-hydroquinone-dialkyl- and amino-hydroquinone-diaralkyl-ethers, and R represents a member of the group consisting of aminosulphonic acids of the benzene and naphthalene series.

8. The substantive polyazo-dyestuff which corresponds in the free state to the following formula

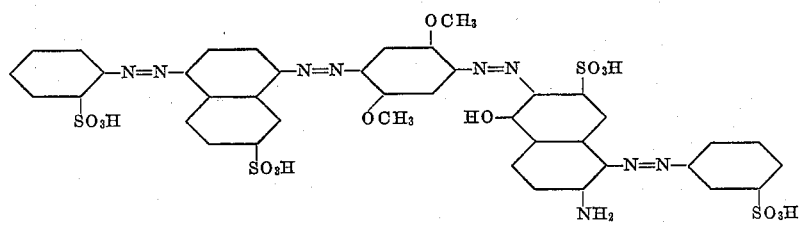

9. The substantive polyazo-dyestuff which corresponds in the free state to the following formula

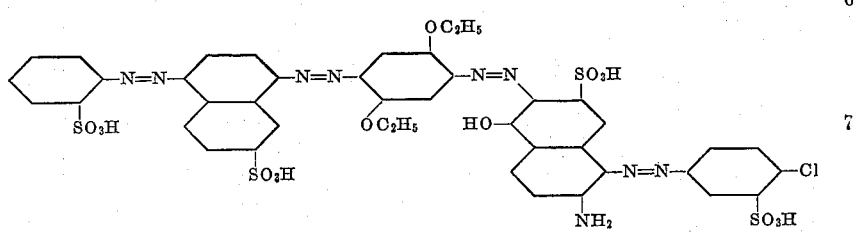

10. The substantive polyazo-dyestuff which corresponds in the free state to the following formula
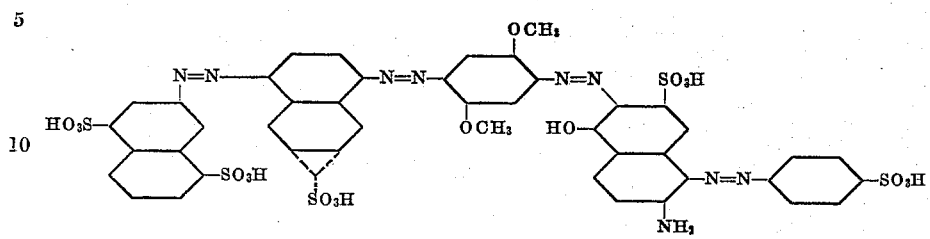
ADOLF KREBSER.